US008421797B2

(12) United States Patent
Kido et al.

(10) Patent No.: US 8,421,797 B2
(45) Date of Patent: Apr. 16, 2013

(54) REMOTE CONTROL SYSTEM AND REMOTE CONTROL APPARATUS

(75) Inventors: Toru Kido, Shizuoka (JP); Yorihide Takehara, Shizuoka (JP); Masataka Ito, Saitama (JP); Maki Sugimoto, Tokyo (JP); Fumitoshi Matsuno, Kyoto (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 771 days.

(21) Appl. No.: 12/625,628

(22) Filed: Nov. 25, 2009

(65) Prior Publication Data

US 2010/0134488 A1 Jun. 3, 2010

(30) Foreign Application Priority Data

Nov. 28, 2008 (JP) ................. 2008-304655

(51) Int. Cl.
*G06T 15/00* (2006.01)
(52) U.S. Cl.
USPC ............ 345/419; 345/629; 345/630; 250/330
(58) Field of Classification Search .................. 345/419, 345/629, 630; 250/330
See application file for complete search history.

(56) References Cited

U.S. PATENT DOCUMENTS

| 7,170,058 B2 * | 1/2007 | Miyano et al. ................. 250/330 |
| 8,212,211 B2 * | 7/2012 | Drews et al. ................. 250/330 |
| 2002/0126913 A1 | 9/2002 | Kotake et al. |

(Continued)

FOREIGN PATENT DOCUMENTS

| EP | 0 921 376 A1 | 6/1999 |
| JP | 61-255413 A | 11/1986 |

(Continued)

OTHER PUBLICATIONS

Shiroma et al, Synthesized Scene Recollection for Vehicle Teleoperation, Transaction of the Society of Instrument and Control Engineers, vol. E-5, No. 1, 17/25, 2006, pp. 17-25.*

(Continued)

*Primary Examiner* — Phu K Nguyen
(74) *Attorney, Agent, or Firm* — Keating & Bennett, LLP

(57) ABSTRACT

A remote control system and a remote control apparatus allow a human operator to remotely control a mobile body easily even if the system uses a low-speed communications link. The remote control system includes a remote control apparatus, in which a CPU selects old information based on both old information and the latest mobile body information from a mobile body, and determines a virtual view point V. The CPU generates a three-dimensional environmental image K and the virtual view point V based on the selected old information, and also generates a mobile body model M, a reference point B and a clipping center point based on the latest mobile body information and data regarding a mobile body model M, in a global coordinate system GC. The CPU calculates an angle of view based on a distance d between the virtual viewpoint V and the reference point B, makes a perspective projection of the three-dimensional environmental image K and the mobile body model M from the virtual view point V toward the clipping center point to obtain a projected image, makes a clip from the projected image based on the angle of view thereby making a composite image, and converts the composite image into a display image of a predetermined size. The resulting display image is displayed on a monitor.

4 Claims, 16 Drawing Sheets

Case: Present invention was applied

Case: Present invention was not applied

U.S. PATENT DOCUMENTS

| | | |
|---|---|---|
| 2003/0096648 A1 | 5/2003 | Ohno et al. |
| 2005/0187015 A1 | 8/2005 | Suzuki et al. |
| 2007/0165033 A1 | 7/2007 | Matsuno et al. |

FOREIGN PATENT DOCUMENTS

| | | |
|---|---|---|
| JP | 61-267182 A | 11/1986 |
| JP | 2-116494 A | 5/1990 |
| JP | 6-501585 A | 2/1994 |
| JP | 8-191487 A | 7/1996 |
| JP | 8-305841 A | 11/1996 |
| JP | 9-62861 A | 3/1997 |
| JP | 11-168754 A | 6/1999 |
| JP | 11-291991 A | 10/1999 |
| JP | 2000-79587 A | 3/2000 |
| JP | 2000-237451 A | 9/2000 |
| JP | 2001-114045 A | 4/2001 |
| JP | 2002-269592 A | 9/2002 |
| JP | 2003-150980 A | 5/2003 |
| JP | 2003-267295 A | 9/2003 |
| JP | 2005-208857 A | 8/2005 |
| JP | 2005-230263 A | 9/2005 |
| JP | 2006-279648 A | 10/2006 |
| JP | 2008-33438 A | 2/2008 |
| JP | 2008-102620 A | 5/2008 |
| WO | 92/21208 A1 | 11/1992 |

OTHER PUBLICATIONS

Shiroma et al., "Synthesized Scene Recollection for Vehicle Teleoperation," The Society of Instruction and Control Engineers, vol. 41, No. 12, Dec. 17, 2005, pp. 1036-1043.

* cited by examiner

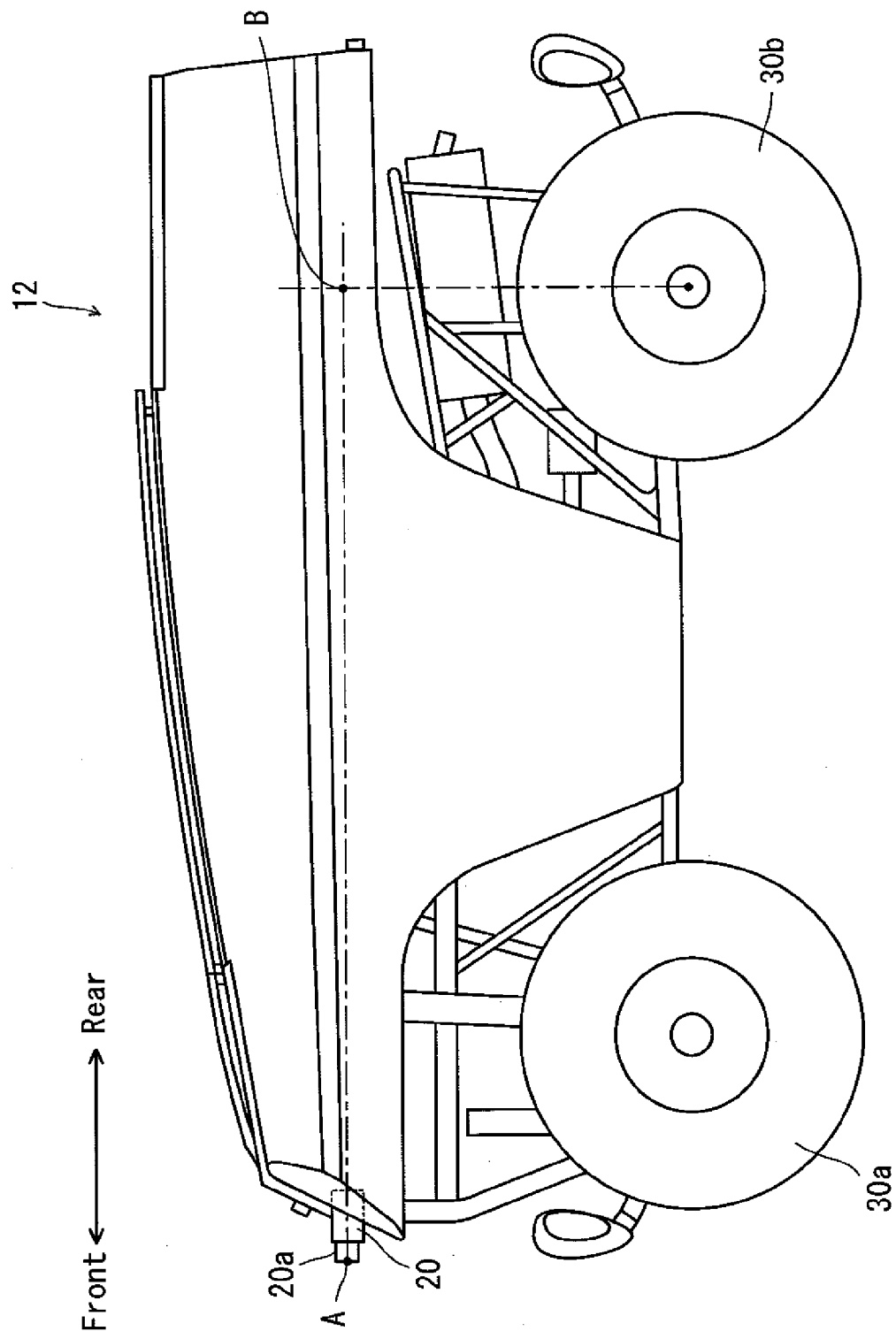
F I G. 2

F I G. 7
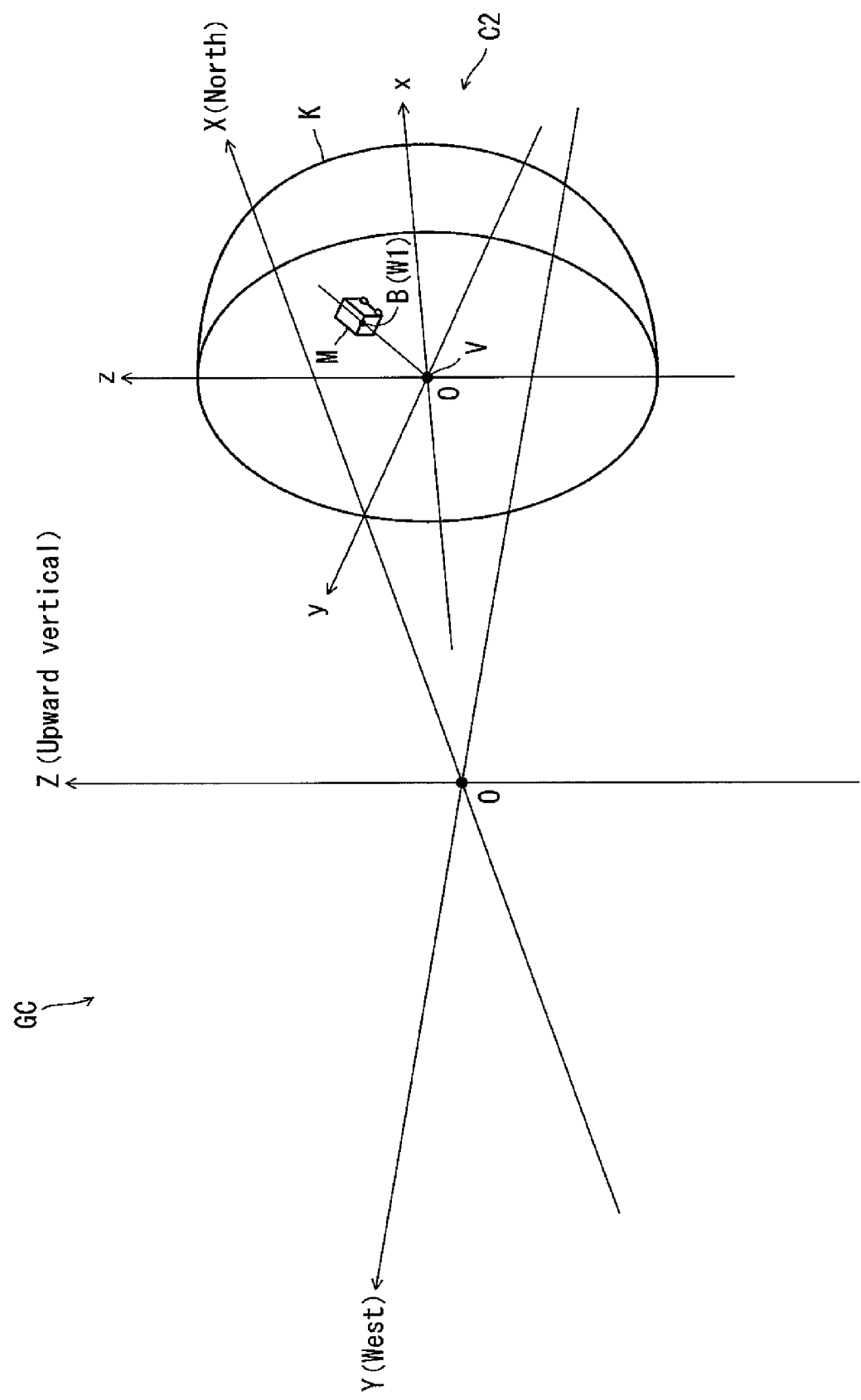

F I G. 8
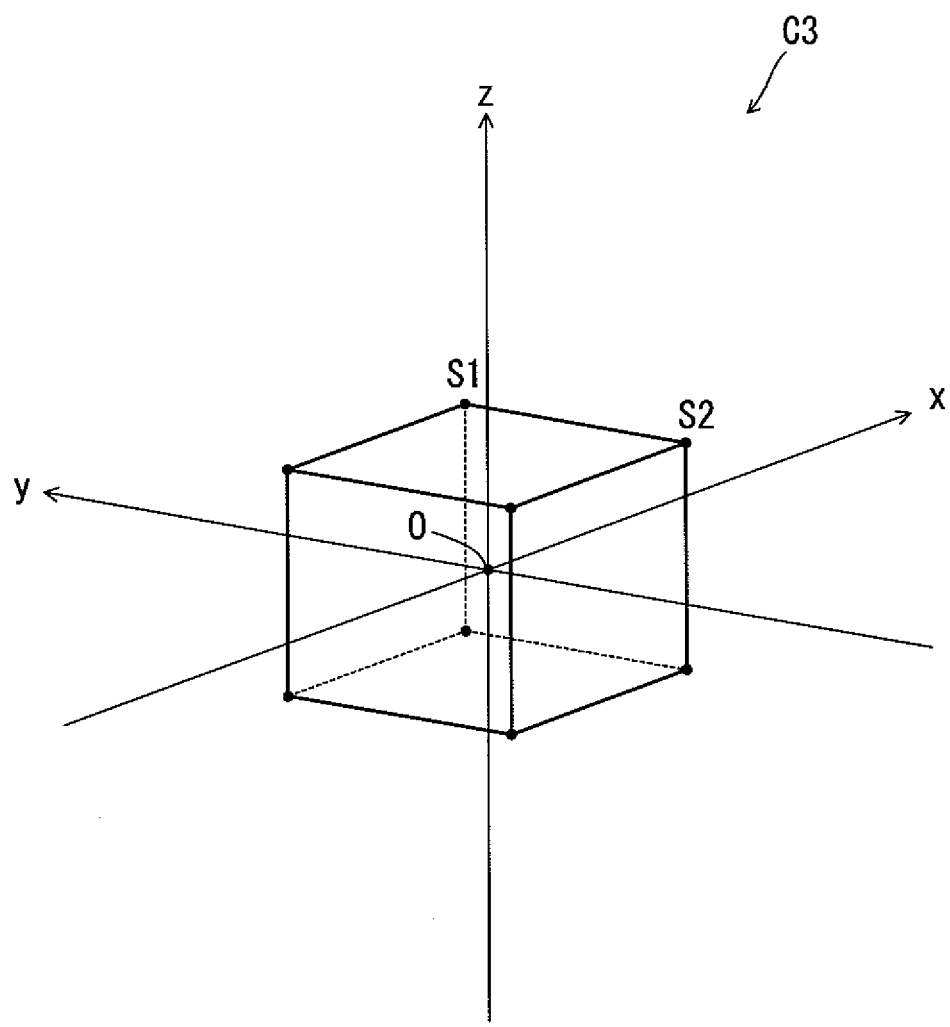

FIG. 11A
Case: Present invention was applied
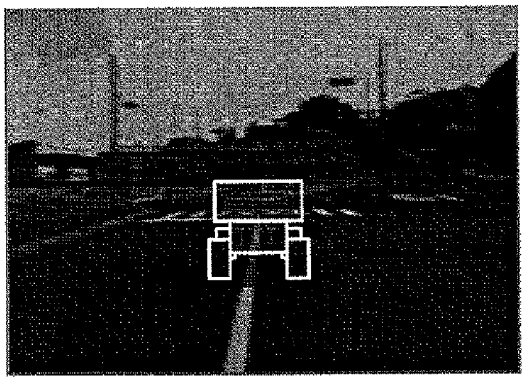
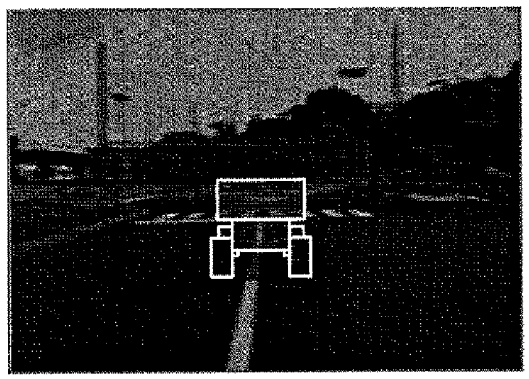
FIG. 11B
Case: Present invention was not applied
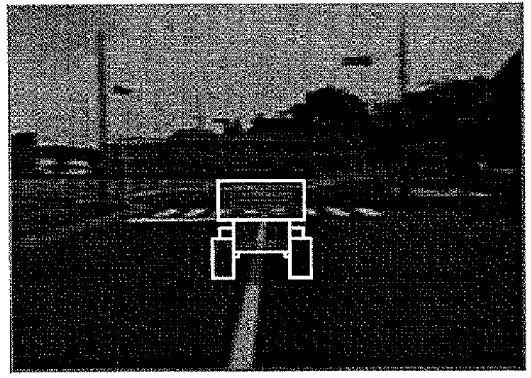
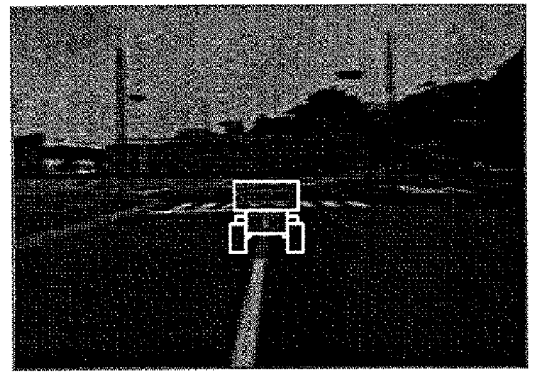

F I G. 1 2
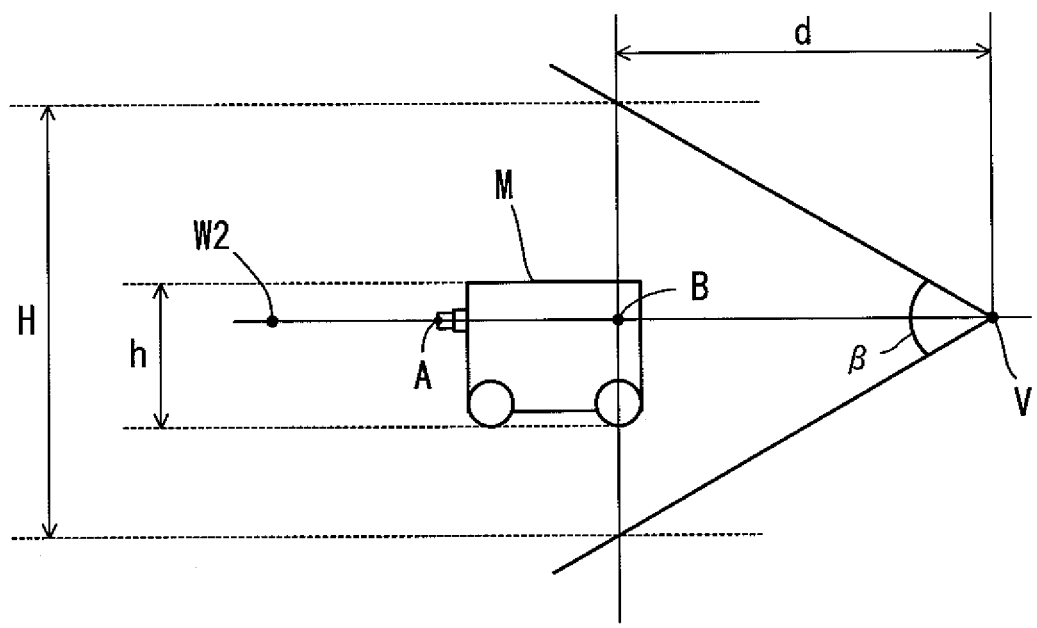

REMOTE CONTROL SYSTEM AND REMOTE CONTROL APPARATUS

BACKGROUND OF THE INVENTION

1. Field of the Invention

The present invention relates to remote control systems and remote control apparatuses, and more specifically to remote control systems and remote control apparatuses for remotely controlling a mobile body.

2. Description of the Related Art

Remote control systems for remotely controlling a mobile body, such as an automobile, from a distance by means of a remote control apparatus are already public, and in the field of remote control systems, there have been a number of technical proposals for easier remote control operations of the mobile body. An example of such efforts is an image generation system disclosed in JP-A 2005-208857. The system displays a composite image of an environmental image which was taken in the past by a camera provided in the mobile body and a mobile body image placed thereon.

JP-A 2005-208857 discloses that in cases where communications means between the mobile body and the remote control apparatus is provided by a slow-speed (narrow band) communication means, updating of the mobile body image is performed while the environmental image is fixed. Fixing the environmental image in this way makes it possible to reduce the number of environmental images which must be sent from the mobile body to the remote control apparatus and the amount of data communications from the mobile body to the remote control apparatus.

A problem, however, in the case of fixing the environmental image according to the disclosure in JP-A 2005-208857, as follows. As the mobile body image is updated, the mobile body image moves from a predetermined position in the environmental image. This takes place in such a manner that the mobile body image becomes increasingly smaller with respect to the environmental image as the mobile body moves away from the place at which the environmental image was taken, making the remote controlling of the mobile body increasingly difficult.

SUMMARY OF THE INVENTION

In view of the above, preferred embodiments of the present invention provide a remote control system and a remote control apparatus with which the operator can perform a remote control operation of the mobile body easily even if the system uses a low-speed communications device.

According to a preferred embodiment of the present invention, a remote control system includes a mobile body and a remote control apparatus to remotely control the mobile body. The mobile body includes an image taking device arranged to take an environmental image around the mobile body, and an information detection device arranged to detect information regarding the mobile body and the image taking device. The remote control apparatus includes a determination device arranged to determine a virtual view point based on a detection result from the information detection device; a first generation device arranged to generate the virtual view point and a three-dimensional environmental image as a three-dimensional interpretation of the environmental image in a virtual space based on the environmental image taken from the virtual view point by the image taking device and a detection result from the information detection device at a time of taking the environmental image; a second generation device arranged to generate a mobile body model as a representation of the mobile body, a reference point which indicates a position of the mobile body, and a clipping center point in the virtual space based on a later detection result from the information detection device after taking the environmental image from the virtual view point and based on data regarding the mobile body model; a calculation device arranged to calculate an angle of view from the virtual view point based on a distance between the virtual view point and the reference point for a generally constant proportion of a size of the mobile body model with respect to a composite image; a third generation device arranged to generate the composite image by clipping from a projected image obtained by perspective projection of the three-dimensional environmental image and the mobile body model from the virtual view point toward the clipping center point, with the clipping being made based on the angle of view from the virtual view point; a conversion device arranged to convert the composite image into a display image; and a display device arranged to display the display image.

There is also provided a remote control apparatus for remotely controlling a mobile body including image taking device arranged to take an environmental image around the mobile body, and an information detection device arranged to detect information regarding the mobile body and the image taking device. The remote control apparatus includes a determination device arranged to determine a virtual view point based on a detection result from the information detection device; a first generation device arranged to generate a three-dimensional environmental image as a three-dimensional interpretation of the environmental image and the virtual view point, in a virtual space based on the environmental image taken from the virtual view point by the image taking device and a detection result from the information detection device at a time of taking the environmental image; a second generation device arranged to generate a mobile body model as a representation of the mobile body, a reference point which indicates a position of the mobile body, and a clipping center point in the virtual space based on a later detection result from the information detection device after taking the environmental image from the virtual view point and based on data regarding the mobile body model; a calculation device arranged to calculate an angle of view from the virtual view point based on a distance between the virtual view point and the reference point for a generally constant proportion of a size of the mobile body model with respect to a composite image; a third generation device arranged to generate the composite image by clipping from a projected image obtained by perspective projection of the three-dimensional environmental image and the mobile body model from the virtual view point toward the clipping center point, with the clipping being made based on the angle of view from the virtual view point; a conversion device arranged to convert the composite image into a display image; and a display device arranged to display the display image.

According to the preferred embodiments of the present invention described above, a virtual view point is determined based on a detection result from the information detection device, and a three-dimensional environmental image and the virtual viewpoint are generated in a virtual space based on an environmental image which was taken from the virtual view point by the image taking device, and based on a detection result from the information detection device at the time when the environmental image was taken. Also, a mobile body model, a reference point and a clipping center point are generated in the virtual space based on a later detection result from the information detection device after the environmental image was taken from the virtual view point as well as on data regarding the mobile body model. Then, calculation is performed to determine an angle of view from the virtual view point which will give a substantially constant proportion of the mobile body model to a composite image, based on a distance between the virtual view point and the reference point. In other words, a smaller angle of view (clipping range) is given when there is a larger distance from the virtual view point to the reference point of the mobile body whereas a larger angle of view (clipping range) is given when the distance from the virtual view point to the reference point is smaller. Then, perspective projection of the three-dimensional environmental image and the mobile body model is performed from the virtual view point toward the clipping center point to obtain a projected image, from which clipping is made based on the angle of view from the virtual view point, to obtain the composite image. The composite image is converted into a display image of a predetermined size. In this process, the size of the composite image is increased or decreased as needed. Then, the display image is displayed on the display device. The size of the mobile body model in the display image is substantially constant.

Through successive display of such display images, it is possible to provide the operator with a view of the moving mobile body model in a substantially constant size. This allows the operator to have a better grasp of how the mobile body is moving, and therefore to remotely control the mobile body more easily. This is especially advantageous for applications where the communications system or link is of a slow-speed type and one three-dimensional environmental image must be used for a plurality of times of updating the mobile body model. In other words, even with the communications system or link having a slow communication speed, the operator can perform remote control of the mobile body easily.

Preferably, the clipping center point is at a position of the reference point. By using the reference point, which indicates the position of the mobile body, as the clipping center point, the mobile body model is disposed at the center of the composite image. Therefore, updating the virtual view point does not much alter the position of the mobile body model in the display image, and the mobile body model appears substantially at the same position in the display image. Through successive display of such display images, it is possible to provide the operator with a natural view of the mobile body model in motion. This allows the operator to have even better grasp of how the mobile body is moving, and therefore to remotely control the mobile body more easily.

Further preferably, the clipping center point is ahead of the mobile body by a predetermined distance. In this case, it is possible to obtain a display image which provides the operator with a wider view ahead of the mobile body model when the mobile body makes a left or right turn. This helps the operator have better perception on the environment in which the mobile body is moving, and make his/her remote control operation on the mobile body more easily.

The above-described and other elements, features, characteristics, steps, aspects and advantages of the present invention will become clearer from the following detailed description of preferred embodiments of the present invention with reference to the drawings.

BRIEF DESCRIPTION OF THE DRAWINGS

FIG. 2 is a left-side view showing an example of mobile body.

FIG. 7 is a drawing which shows a global coordinate system as a virtual space.
FIG. 8 is a drawing for describing a method of generating a mobile body model.
FIG. 11A shows an example of display image according to the remote control system of a preferred embodiment of the present invention, whereas
FIG. 11B shows an example of display image when the present invention is not applied and a constant angle of view is used in clipping the image from a projected image.
FIG. 12 is a drawing which shows a vertical angle of view according to an additional preferred embodiment of the present invention.

DETAILED DESCRIPTION OF THE PREFERRED EMBODIMENTS

Figure 1:
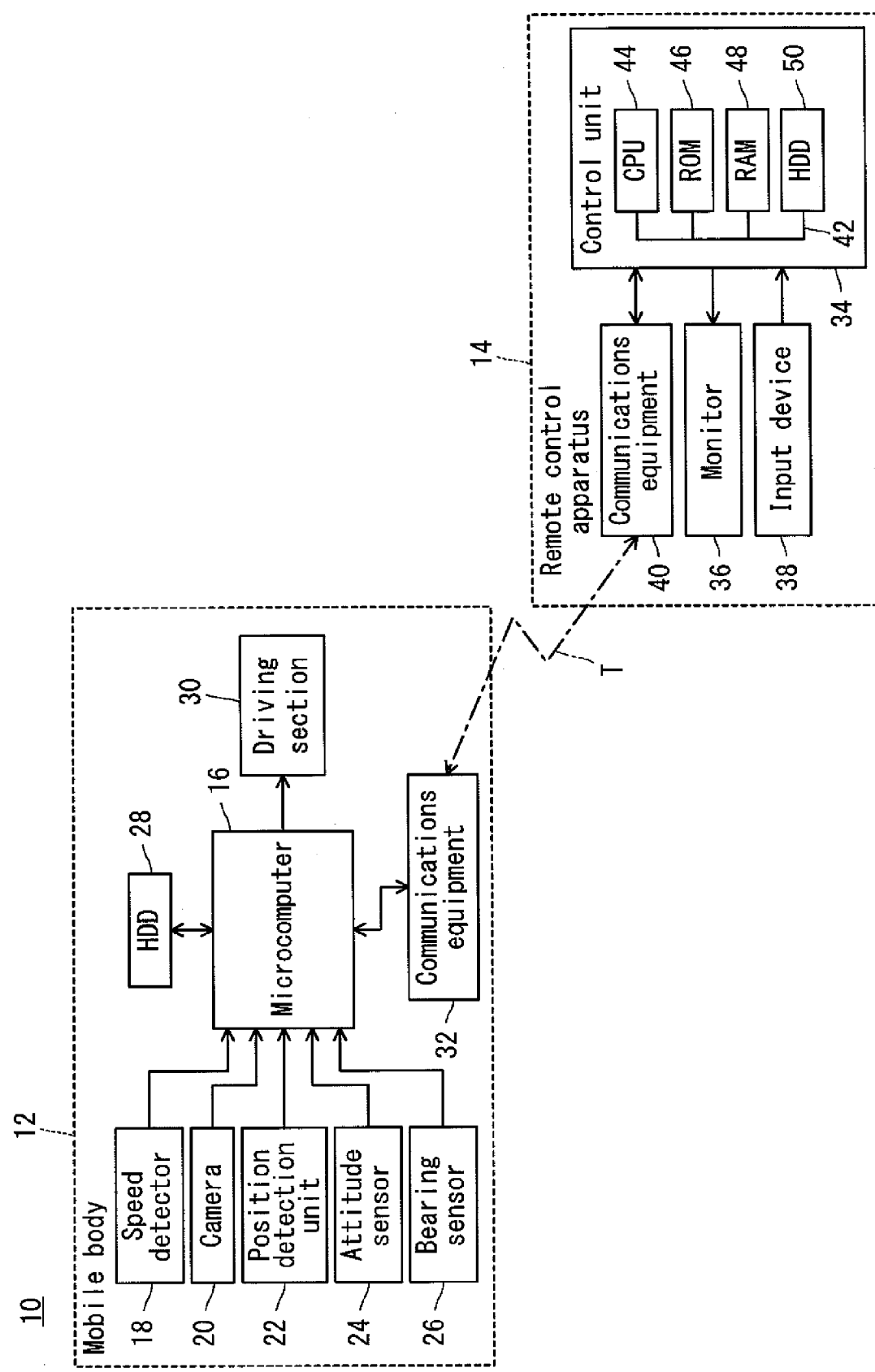
FIG. 1 is a block diagram showing a remote control system according to a preferred embodiment of the present invention.

Hereinafter, preferred embodiments of the present invention will be described with reference to the drawings.
FIG. 1 is a block diagram showing a remote control system 10 according to a preferred embodiment of the present invention. FIG. 2 is a left-side view showing a mobile body 12.
Referring to FIG. 1, the remote control system 10 includes the mobile body 12 and a remote control apparatus 14 for remotely controlling the mobile body 12.
Referring to FIG. 2, the mobile body 12 preferably is, for example, a four-wheel buggy capable of traveling on rough terrains for use in a farming operation, surveying, etc., and includes a micro-computer (hereinafter called microcomputer) 16, a speed detector 18, a camera 20, a position detection unit 22, an attitude sensor 24, a bearing sensor 26, a hard disc drive (including a hard disc, and hereinafter called HDD) 28, a driving section 30 and communications equipment 32.
The speed detector 18 is mounted near a rotation shaft of a left-side forward wheel 30a, and detects a speed of the mobile body 12 based on the number of revolutions of the rotation shaft.
The camera 20 is mounted on a slightly upper position in a front center portion of the mobile body 12, and takes environmental images ahead of the mobile body 12. The camera 20 is preferably provided by a digital CCD camera including a lens 20a. The lens 20a is preferably a wide-angle lens, and in the present preferred embodiment it is provided by a circumference fisheye lens which has a 180° angle of view. The arrangement enables the camera 20 to take wide-angle images. By definition, the lens 20a has a view point A at its center point, and the view point A represents the position of the camera 20.

The position detection unit 22 is mounted on a reference point B which represents the position of the mobile body 12 for the purpose of detecting the position of the mobile body 12. In the present preferred embodiment, the reference point B is an intersection made by a straight line which is drawn from the view point A in a horizontal and right rearward direction and a vertical line which passes the middle point between two rear wheels 30b. The position detection unit 22 detects the position of the reference point B by receiving signals from GPS (Global Positioning System) satellites.

The attitude sensor 24 is preferably provided by a 3D gyro sensor or inclination sensor, for example, and detects a lateral inclination (rolling angle) of the mobile body 12 and a longitudinal inclination (pitching angle) of the mobile body 12.

The bearing sensor 26 detects a forward orientation (bearing angle) of the mobile body 12.

The HDD 28, which provides a storage device, preferably is a device for writing/reading programs, control data, text data, image data, etc., to/from the hard disc following instructions from the microcomputer 16, and stores detection results provided by various sensors, data regarding the environmental images taken by the camera 20, various programs, etc.

The driving section 30 preferably includes two front wheels 30a, two rear wheels 30b, and in addition to these, a steering motor for steering control of the mobile body 12, a throttle motor for throttle control, and a brake motor for moving a brake lever and other elements.

The communications equipment 32 is used to perform communications between the mobile body 12 and the remote control apparatus 14 via a communications link T. The communications link T may be any type of wired or wireless communications links, such as radio or wired links. The communications link T provides data communications link preferably in the form of, e.g., wireless LAN or mobile telephone link, for example. The communications link T provides a communication speed of approximately 250 kbps, for example.

The microcomputer 16 preferably includes a CPU, a RAM, a ROM, a clock, etc., and controls operations of the mobile body 12. The microcomputer 16 obtains detection results from the position detection unit 22, the attitude sensor 24 and the bearing sensor 26 at a time interval of about 0.02 seconds, for example. Simultaneously, the microcomputer 16 calculates an accumulated distance of travel made by the mobile body 12 from the time when the microcomputer 16 was started based on detection results from the speed detector 18. The position, attitude, orientation and accumulated distance of travel of the mobile body 12 together with data collection time of these data are stored as "mobile body information" in the HDD 28, and also sent from the communications equipment 32 to the remote control apparatus 14. The microcomputer 16 also obtains image data of an environmental image from the camera 20 as well as camera information (position, attitude and orientation of the camera 20) of the time when the environmental image was taken, at a time interval of about three seconds, for example. These image data and camera information, together with the accumulated distance of travel of the mobile body 12 and the image taking time when the environmental image was taken, are stored as "old information" in the HDD 28, and also sent from the communications equipment 32 to the remote control apparatus 14.

In the present preferred embodiment, the camera 20 is preferably fixed to the mobile body 12 so there is a constant distance between the view point A which indicates the position of the camera 20 and the reference point B which indicates the position of the mobile body 12. Therefore, the position of the camera 20 can be obtained from the position of the mobile body 12, by shifting the coordinate values of the mobile body 12 by values equivalent to the fixed distance in the fore-aft direction, right-left direction and up-down direction (only the fore-aft shift is necessary in the present preferred embodiment). Also, since the camera 20 and the mobile body 12 have the same attitude and orientation, the attitude and orientation of the mobile body 12 can be used as the attitude and orientation of the camera 20. Therefore, camera information for a time point when an environmental image was taken can be obtained from the mobile body information of that time point.

The microcomputer 16 also controls the driving section 30.

Returning to FIG. 1, the remote control apparatus 14 will be described.

The remote control apparatus 14 preferably includes a control unit 34 provided by a personal computer, for example, a monitor 36 provided by a liquid crystal display, for example, for displaying images, etc., to assist the human operator to operate the mobile body 12, an input device 38 arranged to allow the operator to control the mobile body 12, and communications equipment 40 arranged to communicate with the communications equipment 32 of the mobile body 12 via the communications link T.

The control unit 34 includes a CPU 44 and storage devices provided by a ROM 46, a RAM 48 and an HDD 50 which are connected with each other via a bus 42.

The CPU 44 executes various programs stored in the storage device such as the ROM 46 and the HDD 50, issues instructions to various system components, and controls operations of the remote control apparatus 14.

The HDD 50 is a device for writing/reading programs, control data, text data, image data, etc., to/from the hard disc under the instructions given by the CPU 44. The HDD 50 stores (keeps) image processing programs, data relevant to a mobile body model M, the old information which was sent from the mobile body 12, etc., for execution of operations shown in FIG. 3.

The ROM 46 stores a start-up program, etc. The start-up program is executed by the CPU 44 when power is turned on to the control unit 34. The execution includes loading of the RAM 48 with such programs as an operating system (OS) from the HDD 50, which enables execution of various processes and operations.

Figure 3:
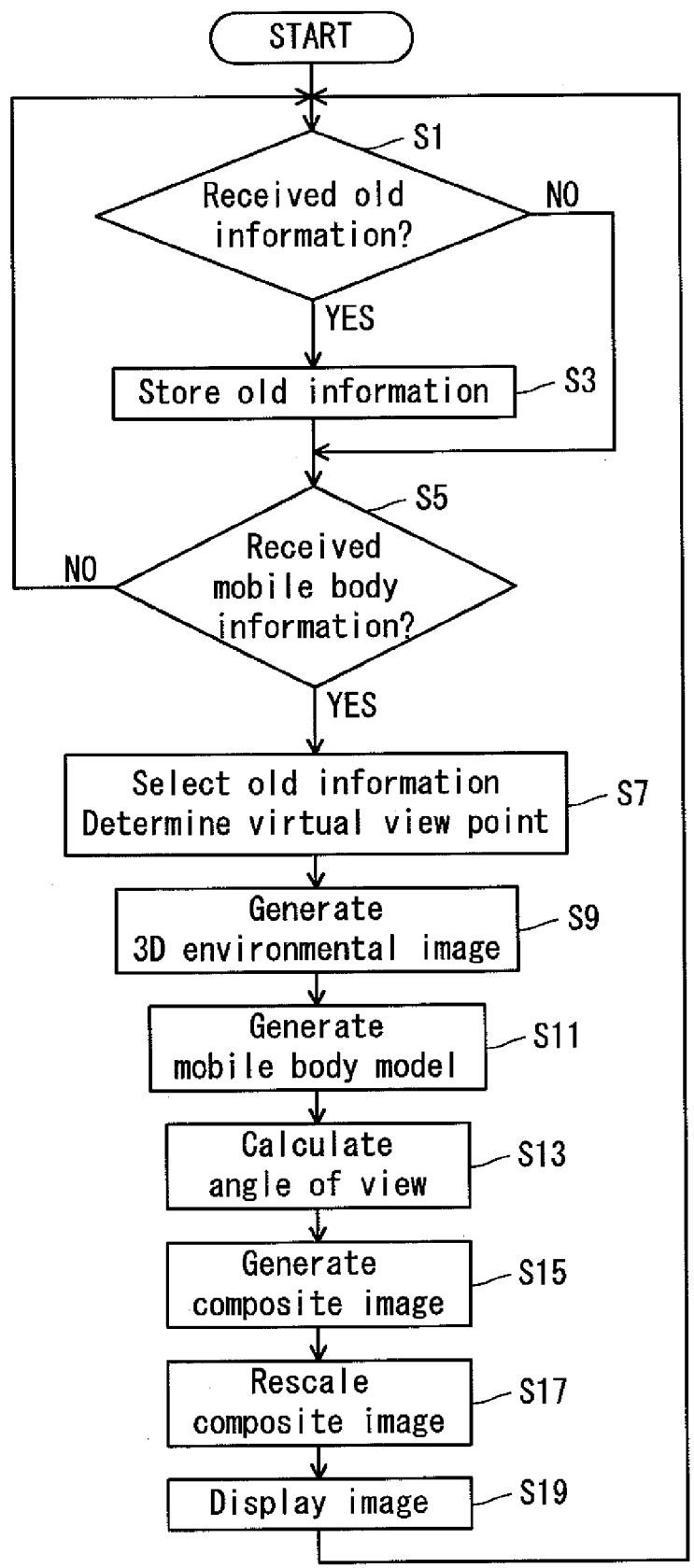
FIG. 3 is a flowchart showing an example of an image processing operation in a remote control apparatus of the remote control system in FIG. 1.

The RAM 48 serves as a working bench for the image processing programs, etc., which are necessary for performing operations shown in FIG. 3. The RAM 48 also works as a memory for keeping processing results given by the programs, temporary data for use in processing, display data (image data, text data, etc.), and so on. The RAM 48 is used by the CPU 44 as a working area. The display data on the RAM 48 is sent to the monitor 36. The monitor 36 displays display content (images, texts, etc.) indicated by the display data from the RAM 48.

The input device 38 is arranged to be operated to perform steering operations, throttle operations, brake operations, etc. As the input device 38 is operated, instructions corresponding to the desired operation are sent from the remote control apparatus 14 to the mobile body 12.

In the present preferred embodiment, the camera 20 provides an image taking device. The information detection device includes the speed detector 18, the position detection unit 22, the attitude sensor 24 and the bearing sensor 26. The CPU 44 in the remote control apparatus 14 serves as the determination device, the first through the third generation devices, the calculation device and the conversion device. The monitor 36 represents the display device.

Next, reference will be made to FIG. 3 to describe an example of image processing operations performed in the remote control apparatus 14 of the remote control system 10. The remote control apparatus 14 performs an image processing for displaying an image in the monitor 36 as a view taken from behind the mobile body 12.

First, the CPU 44 in the remote control apparatus 14 determines whether or not there has been a reception of old information from the mobile body 12 (Step S1). If there has been a reception of old information, the old information is stored in the HDD 50 (Step S3), and the process goes to Step S5. On the other hand, if there has not been a reception of old information in Step S1, the process goes directly to Step S5. In Step S5 the CPU 44 determines whether or not there has been a reception of the latest mobile body information as of the current time. If there has not been a reception of the latest mobile body information from the mobile body 12, the process returns to Step S1. On the other hand, if there has been a reception of the latest mobile body information, the CPU 44 selects, based on this mobile body information, a set of old information from a library of old information stored in the HDD 50, and determines a virtual view point V (Step S7). The virtual view point V is a view point which is assumed to be behind a current position of the mobile body 12. In the present preferred embodiment, this point is selected from positions of the image taking device (positions of the view point A of the camera 20) each at the time when the environmental image was taken up until the current time point.

Here, description will be made for how to select old information (mainly environmental image and the virtual view point), with reference to FIG. 4A and FIG. 4B.

Figure 4A:
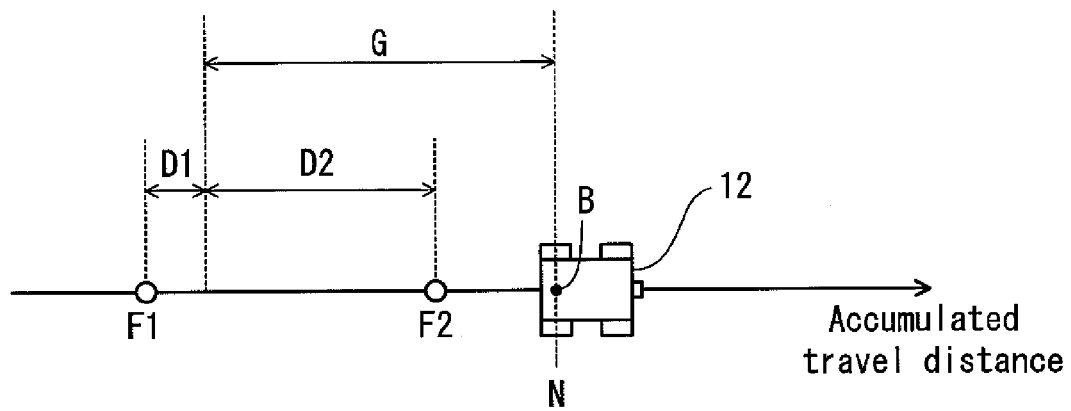
FIG. 4A and FIG. 4B are drawings for describing a selection method of old information.
Figure 4B:
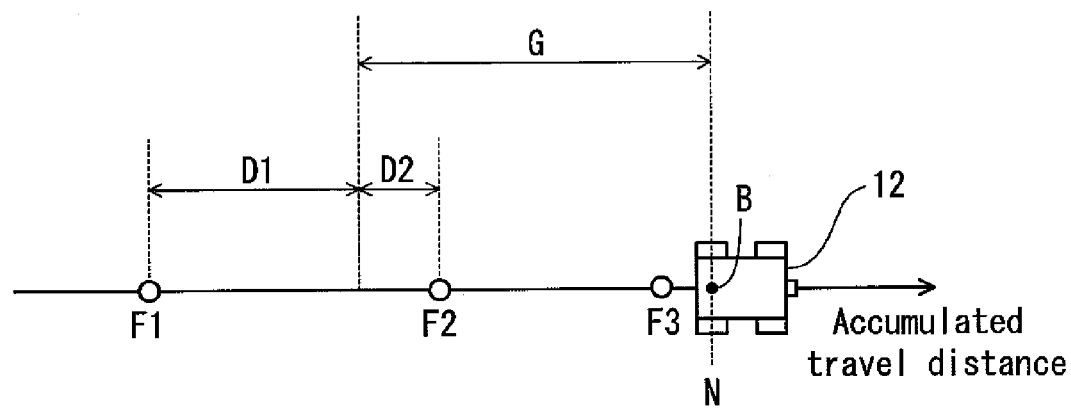

FIG. 4A and FIG. 4B are drawings for describing a method for selecting old information. In FIG. 4A and FIG. 4B, the horizontal axis indicates the accumulated distance of travel of the mobile body 12. White circles indicated by F1, F2 and F3 indicate accumulated travel distances included in old information, and the more the position moves in the direction of the arrow, the greater the accumulated travel distance. At each point of the accumulated travel distances F1, F2 and F3, an environmental image is taken. The image and the position of the view point A of the camera 20 at the time when the image was taken are included in a relevant set of old information and stored in the HDD 50. A letter N indicates an accumulated travel distance at a current position of the mobile body 12. FIG. 4B shows a chronologically later state than FIG. 4A.

In the present preferred embodiment, a position which is behind the current position of the mobile body 12 by a predetermined distance G (about 6 meters, for example) is selected as a reference position. Then, a set of old information which was obtained at a position that is closest to the reference position is selected, and the image taking point of the environmental image included in this old information is selected as the virtual view point V. In other words, in Step S7, the CPU 44 calculates a distance by subtracting the predetermined distance G from the accumulated travel distance N which is included in the mobile body information obtained in Step S5, and then selects a set of old information which includes an accumulated travel distance that is closest to the calculated distance.

Specifically, the selection is made in the following procedure:

Distances D1 and D2 shown in FIG. 4A and FIG. 4B are obtained by Mathematical Expression 1 below.

$$D1 = |F1 - (N-G)|$$

$$D2 = |F2 - (N-G)|$$

Mathematical Expression 1:

At the time point in FIG. 4A, the two distances are in the relationship of D1<D2. Therefore, a set of old information which contains the accumulated travel distance F1 is selected. In other words, an environmental image which was taken when the accumulated travel distance was F1 is selected, and the position of the viewpoint A of the camera 20 when the accumulated travel distance was F1 is selected as the virtual view point V. At the time point in FIG. 4B where the current accumulated travel distance N has a greater value than in FIG. 4A, the two distances have a relationship of: D1>D2. Therefore, a set of old information which contains the accumulated travel distance F2 is selected. In other words, an environmental image which was taken when the accumulated travel distance was F2 is selected, and the position of the view point A of the camera 20 when the accumulated travel distance was F2 is selected as the virtual view point V.

Returning to FIG. 3, the CPU 44 thereafter generates a three-dimensional environmental image K and the virtual view point V based on an environmental image I in the global coordinate system GC as a virtual space (Step S9), on the basis of the old information which was selected in Step S7.

This process will be described with reference to FIG. 5 through FIG. 7.

Figure 5:
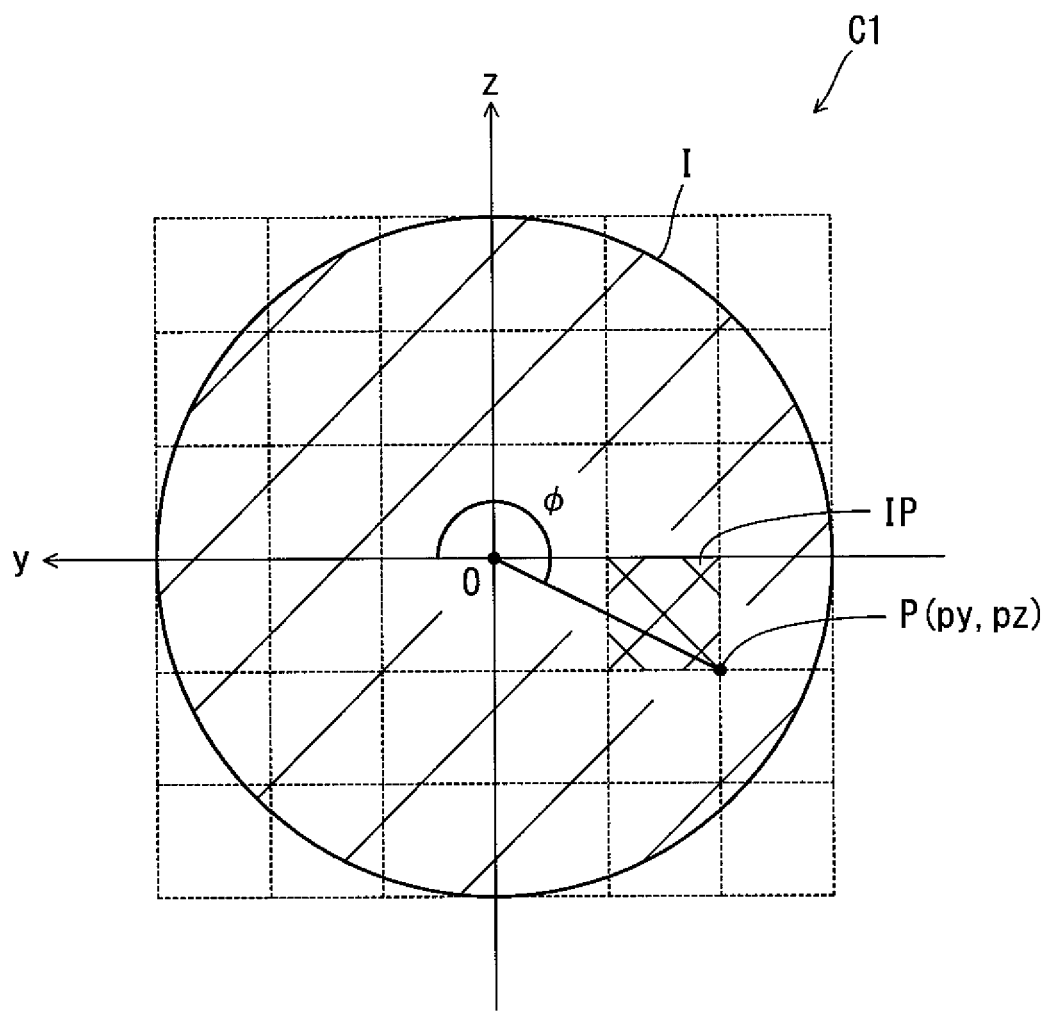
FIG. 5 is a drawing which shows a two-dimensional orthogonal coordinate system in which an environmental image is depicted.

FIG. 5 is a drawing which shows a two-dimensional orthogonal coordinate system C1 defined by a y axis and a z axis in which the environmental image I taken by the camera 20 is placed. The environmental image I is a two-dimensional fisheye image (circular image) which contains the whole view ahead of the lens 20a. The environmental image I has a center point which corresponds to the view point A of the camera 20 (see FIG. 2). The camera has a center of image taking which is oriented in a direction perpendicular to the paper in which FIG. 5 is printed (the x-axis direction in the coordinate system C2 in FIG. 6).

Figure 6:
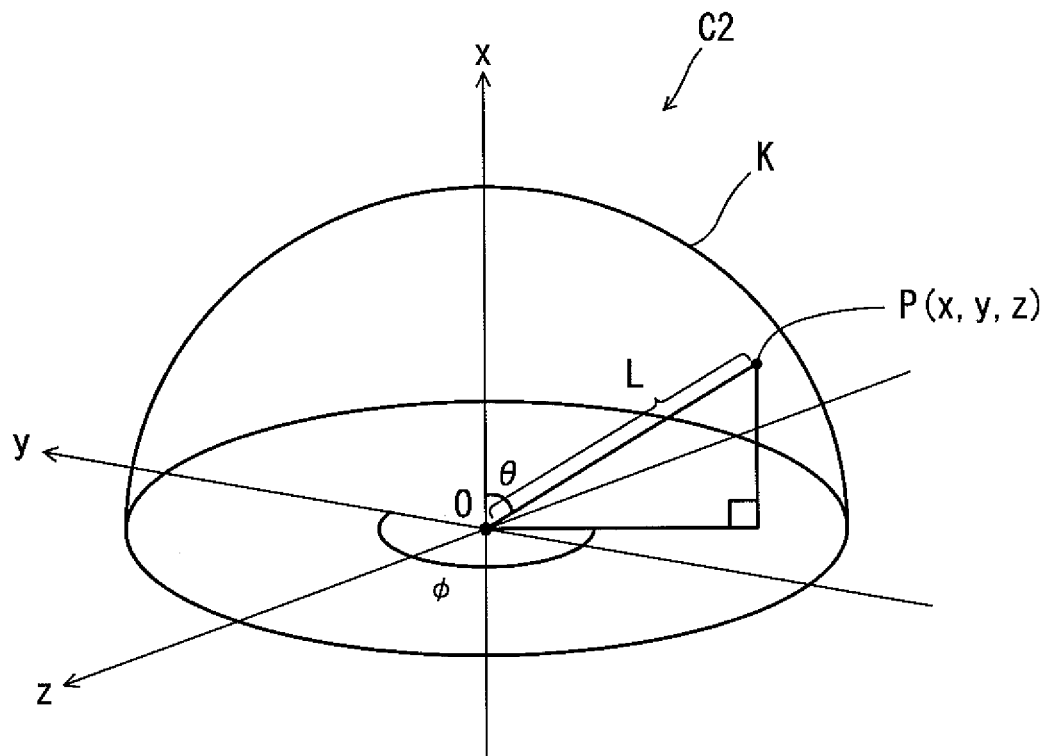
FIG. 6 is a drawing which shows a three-dimensional orthogonal coordinate system for displaying a three-dimensional environmental image.

FIG. 6 is a drawing which shows a three-dimensional orthogonal coordinate system C2 for displaying the three-dimensional environmental image K which is created by a three-dimensional conversion of the two-dimensional environmental image I. In the coordinate system C2, the point of origin O is the view point A of the camera 20, the x-axis direction is the orientation of the camera's image taking center, the y-axis direction is a horizontal direction other than the x-axis direction itself but is perpendicular to the x-axis direction when the x-axis direction is a horizontal direction, and the z-axis direction is the vertical direction when the x-axis direction is a horizontal direction.

FIG. 7 is a drawing which shows a global coordinate system GC as a virtual space. The global coordinate system GC is a three-dimensional orthogonal coordinate system defined by an X axis, Y axis and Z axis. The point of origin O of the global coordinate system GC is a position of the view point A of the camera 20 when the microcomputer 16 in the mobile body 12 is started. The X-axis direction indicates the north-south direction, the Y-axis direction indicates the east-west direction and the Z-axis direction indicates the vertical direction.

The flat environmental image I in FIG. 5 is converted into a spatial (preferably hemispheric in the present preferred embodiment, for example) three-dimensional environmental image K shown in FIG. 6 and is generated in the global coordinate system GC shown in FIG. 7. Coordinates P(x, y, z) of the three-dimensional environmental image K in the coordinate system C2 are obtained from Mathematical Expression 2 below based on coordinates P(py, pz) of the environmental image I in the coordinate system C1. The point P(x, y, z) is a point on the hemisphere surface (three-dimensional environmental image K) shown in FIG. 6.

$$x = L \times \cos\theta$$

$$y = L \times \sin\theta \times \cos\phi$$

$$z = L \times \sin\theta \times \sin\phi \quad \text{Mathematical Expression 2:}$$

In the above, the letter φ indicates an angle made by a line segment drawn from the point of origin O in the positive direction of the y axis and a line segment OP (in FIG. 5), and can have values ranging from 0≦φ<2π. Values of φ can be obtained from (py, pz) using the inverse function of tangent (arctan). Also, as shown in FIG. 6, the letter θ indicates an angle made by the x axis and a line segment PO which connects the point of origin O and the point P. The three-dimensional environmental image K has a shape which is determined by characteristics of the lens 20a. Based on this, values of θ can be obtained by calculation using a predetermined mathematical expression based on the coordinates P(py, pz) of the environmental image I, or by reference to table data which is stored in the HDD 50. The angle θ can have values within a range 0≦θ≦π/2. Further, as shown in FIG. 6, a letter L indicates a distance from the point of origin O to the point P (i.e., the radius of the three-dimensional environmental image K in the present preferred embodiment), which may be set to a discretionary value. In the present preferred embodiment, the distant L is set to about 10 m, for example.

Specifically, the coordinates P(x, y, z) of the three-dimensional environmental image K in the coordinate system C2 are obtained as described below.

First, the environmental image I is disposed in the coordinate system C1. The placement is made so that the environmental image I has its center point on the point of origin O of the coordinate system C1. Then, the environmental image I is divided into a plurality of square image pieces (e.g., 256 pieces=16 in height direction×16 in width direction). For graphical simplicity in FIG. 5, division is made into 36 pieces (e.g., 6 in height×6 in width) of square image pieces IP, and for each of the image pieces IP, coordinates P(py, pz) of its four corners are obtained in the coordinate system C1. Subsequently, corresponding coordinates P(x, y, z) in the coordinate system C2 are obtained using Mathematical Expression 2 based on the obtained coordinates P(py, pz).

As described above, coordinates P(x, y, z) in the coordinate system C2 are obtained for four corners of the image piece IP. Then, each set of coordinates P(x, y, z) of the four corners of the image piece IP in the coordinate system C2 is converted into coordinates $(x_G, y_G, z_G)$ in the global coordinate system GC using the attitude (roll angle r and pitch angle p) and the orientation (bearing angle y) of the camera 20 as well as the position $(x_c, y_c, z_c)$ of the camera 20 contained in the old information at the time when the image was taken from the virtual view point V. Such a coordinate conversion can be accomplished generally by axial rotation and parallel translation, using Mathematical Expression 3 below.

Mathematical Expression 3

$$\begin{pmatrix} x_G \\ y_G \\ z_G \end{pmatrix} =$$

-continued $$\begin{pmatrix} \cos y & \sin y & 0 \\ -\sin y & \cos y & 0 \\ 0 & 0 & 1 \end{pmatrix} \begin{pmatrix} \cos p & 0 & \sin p \\ 0 & 1 & 0 \\ -\sin p & 0 & \cos p \end{pmatrix} \begin{pmatrix} 1 & 0 & 0 \\ 0 & \cos r & -\sin r \\ 0 & \sin r & \cos r \end{pmatrix} \begin{pmatrix} x \\ y \\ z \end{pmatrix} + \begin{pmatrix} x_c \\ y_c \\ z_c \end{pmatrix}$$

In the above, the roll angle r, the pitch angle p and the bearing angle y, each being called a Euler angle, are a rotation angle about the x axis, a rotation angle about the y axis and a rotation angle about the z axis respectively of the coordinate system C2 in the in the global coordinate system GC. On each axis, the positive direction is the direction in which a right-hand screw makes advancement. Rolling and pitching are expressed in reference to the vertically upward direction from the point of origin in the global coordinate system GC. Bearing is expressed in reference to the true north direction in the global coordinate system GC.

As described above, coordinates of the four corners are obtained for the image piece IP in the global coordinate system GC. In other words, a position of the image piece IP is determined in the global coordinate system GC. Then, the image piece IP is generated (disposed) at the determined position. This process is performed for all of the image pieces IP, whereby an environmental image I is transformed into a three-dimensional environmental image K as a three-dimensional interpretation in a three-dimensional space in the global coordinate system GC as shown in FIG. 7. When the three-dimensional environmental image K is displayed, the virtual view point V which is at the point of origin O in the coordinate system C2 is generated at a position $(x_c, y_c, z_c)$ where the camera 20 is in global coordinate system GC.

In order to perform the above-described processing in Step S9, a commercially available graphic library can be used. In the present preferred embodiment, a graphic library OpenGL (registered trademark) is preferably utilized. Thus, the process in Step S9 is carried out by a series of operations using mathematical functions provided by OpenGL (registered trademark), i.e., functions {glTexcoord2D (px, py) and glVertex3D (x, y, z); where px and py indicate coordinate values in the coordinate system C1 in FIG. 5; x, y and z indicate coordinate values in the coordinate system GC in FIG. 7}.

It should be noted here that the actual three-dimensional environmental image K is a result of tile work where flat tiles of image pieces IP are pasted together to form a polyhedral (256-hedral in this preferred embodiment) dome shape. Note that FIG. 6 and FIG. 7 illustrate a hemispherical three-dimensional environmental image K for graphical simplicity.

Returning to FIG. 3, Step S9 is followed by a graphic generation task. Namely, based on the latest mobile body information received in Step S5 and data stored in the HDD 50 with regard to a mobile body model M, the CPU 44 generates in the global coordinate system GC a mobile body model M which indicates the mobile body 12, the reference point B which indicates the position of the mobile body 12, and a clipping center point W1 (see FIG. 9A and FIG. 9B) (Step S11).

FIG. 8 is a drawing for a description on how the mobile body model is generated. For simplicity of the description, FIG. 8 shows a mobile body model as a cube.

As shown in FIG. 8, the mobile body model can represent an image of a shape of the mobile body by using a point group and by drawing lines each connecting mutually relevant two points. The mobile body model is disposed in the three-dimensional orthogonal coordinate system C3, with a center of the mobile body model placed at the point of origin of the coordinate system C3 and the front surface of the mobile body model faced in the x-axis direction. Each corner of the mobile body model has coordinate values. For example, assume that in the cubic mobile body model each of the sides has a length of 2. Then, a corner S1 is expressed as (1, 1, 1) and a corner S2 is expressed as (1, −1, 1).

Then, each of the cube's corners is given a corresponding set of coordinates in the global coordinate system GC by coordinate conversion with Mathematical Expression 4 below.

Mathematical Expression 4

$$\begin{pmatrix} x_a \\ y_a \\ z_a \end{pmatrix} = \begin{pmatrix} \cos y & \sin y & 0 \\ -\sin y & \cos y & 0 \\ 0 & 0 & 1 \end{pmatrix} \begin{pmatrix} \cos p & 0 & \sin p \\ 0 & 1 & 0 \\ -\sin p & 0 & \cos p \end{pmatrix} \begin{pmatrix} 1 & 0 & 0 \\ 0 & \cos r & -\sin r \\ 0 & \sin r & \cos r \end{pmatrix} \begin{pmatrix} x_b \\ y_b \\ z_b \end{pmatrix} + \begin{pmatrix} x_m \\ y_m \\ z_m \end{pmatrix}$$

In the above, values $(x_m, y_m, z_m)$ indicate a current position of the mobile body 12 in the global coordinate system GC obtained from the mobile body information. Values $(x_b, y_b, z_b)$ are coordinate values of a point for drawing the mobile body model in the coordinate system C3 (i.e., coordinate values with will be converted in the coordinate conversion). Values $(x_a, y_a, z_a)$ are coordinate values in the global coordinate system GC given by the coordinate conversion of $(x_b, y_b, z_b)$. Letters r, p and y indicate a current roll angle, a pitch angle and a bearing angle respectively of the mobile body 12 in the global coordinate system GC, obtained from the mobile body information. In the present preferred embodiment, these values are the same as the roll angle r, the pitch angle p and the bearing angle y of the camera 20, respectively.

Then, the corners, which are now on the global coordinate system GC after the coordinate conversion, are connected with line segments, whereby a cubic mobile body model is drawn in the global coordinate system GC. In other words, the whole mobile body model has been converted into an image in the global coordinate system.

An actual mobile body model M is created as the model of the mobile body 12 using a point group and by connecting relevant pairs of points with line segments. Also, the actual mobile body model M is disposed in the coordinate system C3 so that its reference point B is at the point of origin O, its front surface is oriented in the x-axis direction and its top is oriented in the z-axis direction. The data concerning the mobile body model M at least includes a set of coordinate values of the coordinate system C3 for each of the points in the point group. Like in Step S9, Mathematical Expression 4 is utilized to perform coordinate conversion for each point in the group, and by connecting mutually paired points with line segments, the mobile body model M is drawn in the global coordinate system GC (see FIG. 7).

It should be noted here that in cases where the mobile body model does not include any lines but is made of a point group only, simply, coordinate conversion to the global coordinate system GC is carried out to coordinate values of all the points in the point group using Mathematical Expression 4.

By following the procedure described above, the mobile body model M is drawn in the global coordinate system GC as a virtual space. Also, the reference point B which indicates the position of the mobile body 12, and the clipping center point W1 which provides the center when clipping the projected image are generated in the global coordinate system GC. In the present preferred embodiment, the reference point B and the clipping center point W1 are at the same position, and they are generated at the current position $(x_m, y_m, z_m)$ of the mobile body 12 in the global coordinate system GC.

Returning to FIG. 3, the CPU 44 calculates an angle of view from the virtual view point V (Step S13) so that the mobile body model M will be displayed in a generally constant size in the display image which is provided to the operator. In this description, the monitor 36 preferably has a screen including 768 pixels in height direction×1024 pixels in width direction, for example, and the display image has a predetermined size of 480 pixels in height×800 pixels in width, for example. Information regarding the size of the display image (480 pixels in height×800 pixels in width, for example), and information regarding an aspect ratio of the display image (height:width=3:5, for example) is stored in the HDD 50 in advance.

Figure 9A:
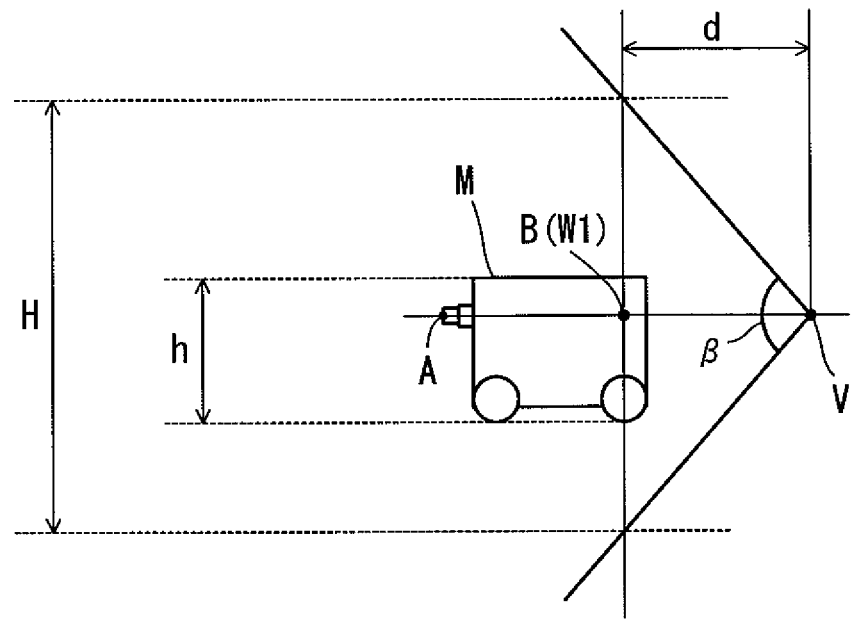
FIG. 9A and FIG. 9B are drawings which show a vertical angle of view in the preferred embodiment shown in FIG. 1.
Figure 9B:
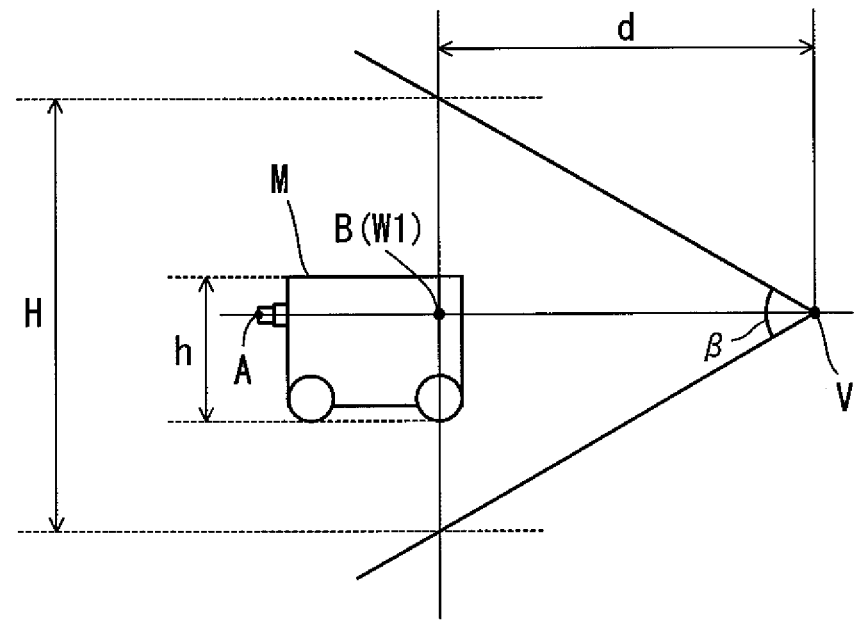

FIG. 9A and FIG. 9B are drawings which show the mobile body model M as generated in the global coordinate system GC and viewed from a side.

In FIG. 9A and FIG. 9B, a letter d indicates a distance from the virtual view point V to the reference point B of the mobile body 12 (the current position of the mobile body 12), a symbol β indicates a vertical angle of view from the virtual view point V, a letter h indicates a height of the mobile body model M, a letter H indicates a clipping width at the distance d (a vertical plane which passes the reference point B) when clipping is made from the virtual view point V at the vertical angle of view β. The distance d can be obtained from the position of the virtual view point V and the position of the reference point B.

Referring to FIG. 9A and FIG. 9B, description will now cover how the vertical angle of view β is calculated.

In displaying the mobile body model M in the monitor 36, the height of the mobile body model M will be in a constant proportion k (0<k<1) to the height of the display image when k=h/H. As an example, k=h/H=0.33.

Also, from FIG. 9A and FIG. 9B, the following relationship is true: d×tan(β/2)=H/2.

From these two mathematical expressions, the vertical angle of view β is obtained by using Mathematical Expression 5 below.

$$\beta = 2 \times \tan^{-1}\left(\frac{h}{2 \times d \times k}\right)$$

Mathematical Expression 5

FIG. 9B shows a state where the mobile body 12 has moved from the state shown in FIG. 9A, and so the distance d from the virtual view point V to the reference point B of the mobile body 12 has been increased. Although the items H, h and k are fixed values, the value of d has been increased, and according to Mathematical Expression 5, the vertical angle of view β in FIG. 9B is smaller than that in FIG. 9A.

Use of the vertical angle of view β as described above makes it possible to keep a substantially constant height of the mobile body model M in the display image. Unlike the case where the vertical angle of view β is fixed, it is now possible to prevent the situation that the mobile body model M is displayed increasingly smaller in the display image, i.e., in the screen of the monitor 36.

Figure 10:
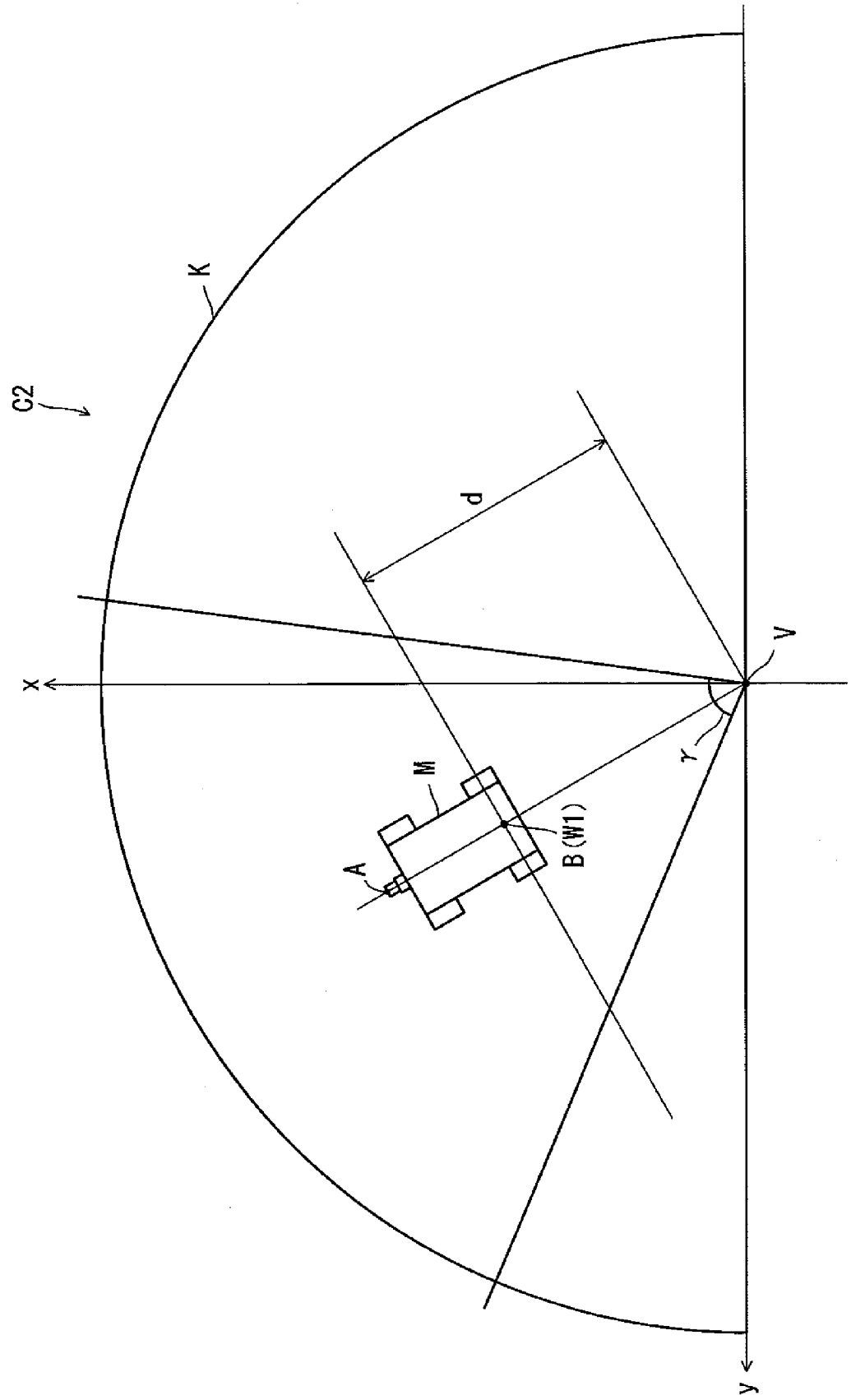
FIG. 10 a drawing which shows a three-dimensional environmental image generated in the global coordinate system and the mobile body model viewed from above.

In FIG. 9B, when the line which connects the virtual view point V with the reference point B is on the x-y plane of the three-dimensional orthogonal coordinate system C2, a horizontal angle of view γ from the virtual view point V will be as shown in FIG. 10.

FIG. 10 is a drawing of a three-dimensional environmental image K and the mobile body model M generated in the global coordinate system GC, as viewed from the positive side of the z-axis direction (see FIG. 7) of the three-dimensional orthogonal coordinate system C2. In FIG. 10, the three-dimensional environmental image K is a hemispherical wide-angle image taken at the virtual view point V and having a 180° angle of view.

Like the vertical angle of view β, the horizontal angle of view γ can be calculated by setting a proportion of the width of the mobile body model M with respect to the width of the display image. The horizontal angle of view γ can also be calculated by using the calculated vertical angle of view β and a predetermined aspect ratio (height:width=3:5, for example).

It should be noted here that a range of clipping from the projected image can be determined based on whichever of the clipping height based on the vertical angle of view β and the clipping width based on the horizontal angle of view γ; and the aspect ratio of the display image (height:width=3:5, for example). In the present preferred embodiment, a combination of the vertical angle of view β and the aspect ratio of the display image is used to determine the clipping range from the projected image. For this reason, Step S13 does not perform a process of obtaining the horizontal angle of view γ.

Returning to FIG. 3, the CPU 44 thereafter generates a composite image (Step S15).

In this process, a perspective projection is performed from the virtual view point V toward the reference point B to obtain a projected image of the three-dimensional environmental image K and the mobile body model M generated in the global coordinate system GC in Steps S9 and S11, and further, clipping is performed to the projected image, from the virtual view point V according to the clipping range which is based on the vertical angle of view β calculated in Step S13 and the aspect ratio of the display image. In the composite image thus obtained, the size of the mobile body model M has a substantially constant proportion to the composite image.

In order to generate the composite image, commercially available three-dimensional graphic libraries can be used, for example. The present preferred embodiment preferably makes use of OpenGL (registered trademark) software and two freeware tools, i.e., "gluLookAt" function and "gluPerspective" function, which are required to use the software on the Microsoft Windows (registered trademark) system. As arguments to the function "gluLookAt", the position of the virtual view point V and the position of the clipping center point W1 in the global coordinate system GC (which is the same position as of the reference point B of the mobile body 12, i.e. the current position of the mobile body 12 in the present preferred embodiment) are given whereas, as arguments to the function "gluPerspective", the vertical angle of view β and the aspect ratio of the display image (height:width=3:5, for example) are given. This enables drawing of a composite image as a perspective projection which includes the three-dimensional environmental image K and the mobile body model M generated in the global coordinate system GC.

The composite image obtained as described above is then rescaled by the CPU 44 so that the image can be displayed in the predetermined size (480 pixels in height×800 pixels in width, for example) in the monitor 36, and in this way, the final display image is obtained (Step S17). If the angle of view is small, or if there is any other reason which requires enlarging the composite image in order to fit the image into the predetermined size, a data interpolation process is performed. On the other hand, if the angle of view is large, or if there is any other reason which requires reducing the composite image in order to fit the image into the predetermined size, a data thinning process is performed. The processes are carried out preferably by using a known method such as nearest neighbor method, bi-linear method, bi-cubic method, etc.

In the present preferred embodiment, scaling up or down of the composite image is accomplished preferably via a nearest neighbor method using the OpenGL (registered trademark) software and a freeware function glutReshapeWindow (wide, height) which is required for the software to run on a Microsoft Windows (registered trademark) system. The argument "wide" indicates the width size of the display image while the argument "height" indicates the height size of the display image. As mentioned earlier, in advance, the argument wide is set to, e.g., 800 pixels, whereas the argument height is set to, e.g., 480 pixels, for example.

Then, the obtained display image of the predetermined size is displayed in the monitor 36 for the operator to view (Step S19).

The above-described series of processes from Steps S1 through S19 are repeated at an interval of approximately 0.1 second, for example.

According to the remote control apparatus 14, and hence to the remote control system 10, it is possible to keep the mobile body model M in the display image substantially in a constant size. It is also possible to dispose the mobile body model M at the center of the composite image by setting the reference point B, which indicates the position of the mobile body 12, at the clipping center point W1. Under this arrangement, updating the virtual view point V will not much change the position of the mobile body model M in the display image, which means that the position of the mobile body model M will be substantially the same in the display image. Through successive display of such display images, the operator is provided with natural views of the mobile body model M in motion. This allows the operator to have a better grasp of how the mobile body 12 is moving, and therefore to remotely control the mobile body 12 more easily. This is especially advantageous for applications where the communications link T is of a slow-speed type. In other words, even with the communications link T of a slow communications speed, the operator can perform remote control of the mobile body 12 easily.

FIG. 11A shows an example of display image according to a preferred embodiment of the remote control system 10 whereas FIG. 11B shows an example of display image where the present invention is not applied and a constant angle of view was used when clipping the projected image.

In the example given in FIG. 11B, the mobile body model becomes increasingly smaller as the mobile body moves away from the virtual view point. On the contrary, in the example in FIG. 11A, the system keeps a substantially constant size and position of the mobile body model in the display image even when the mobile body is moving away from the virtual view point.

The same advantage is also enjoyed at a moment when the virtual viewpoint is changed. When the virtual viewpoint is changed from one to another, there is a sudden change in the distance and positional relationship between the mobile body and the virtual view point. According to the conventional method, therefore, there can be cases where the mobile body model makes a sudden and abrupt jump from one display position to another, or cases where there is also an abrupt change in the size of the mobile body model displayed on the image. When considering the fact that the virtual view point is changed every few seconds when the mobile body is in an actual traveling state, these sudden changes does lower remote operability. According to a preferred embodiment of the present invention, however, the size and the position of the mobile body model are substantially constant in the display image even when there has been a change in the virtual view point and therefore, the operator can stay with the remote control operation without being lost or confused.

Next, reference will be made to FIG. 12 through FIG. 14, to describe another preferred embodiment of the present invention.

In the present preferred embodiment, the clipping center point of the projected image, which defines the center of the display image, is preferably provided by W2 instead of W1. Otherwise, the present preferred embodiment is preferably substantially the same as the previous preferred embodiment. The clipping center point W2 is right ahead of the mobile body 12 by a predetermined distance, for example, at about 6 m ahead of the reference point B which indicates the position of the mobile body 12.

Calculation of the angle of view (vertical angle of view 13) in the present preferred embodiment is performed in the same way as in the previous preferred embodiment using the reference point B, and the vertical angle of view $\beta$ is as shown in FIG. 12.

Then, a perspective projection is performed from the virtual view point V toward the clipping center point W2 to obtain a projected image of the three-dimensional environmental image K and the mobile body model M, and then clipping of the projected image is performed according to the clipping range which is based on the vertical angle of view $\beta$ and the aspect ratio of the display image, to obtain a composite image.

Figure 13:
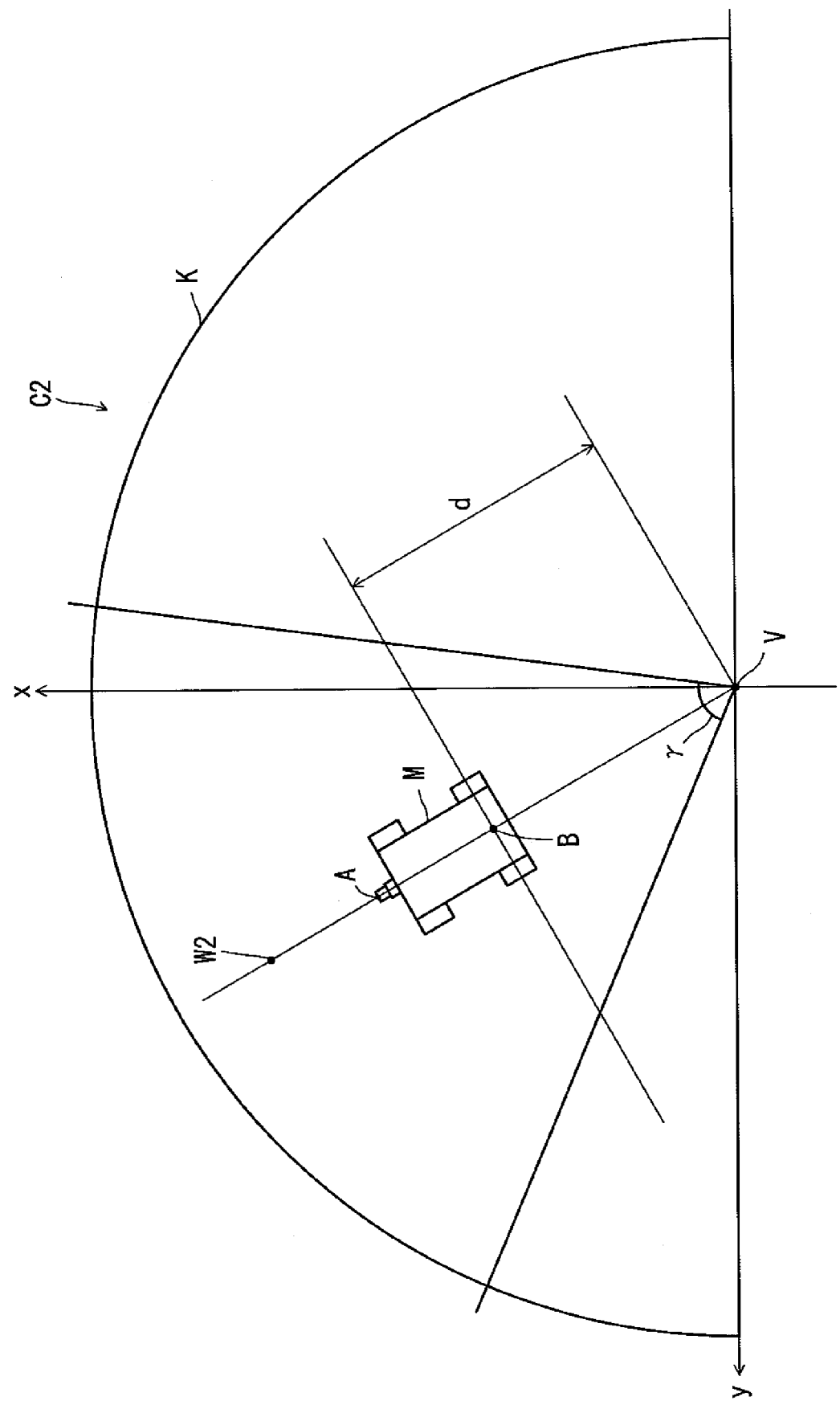
FIG. 13 shows a case where the mobile body model makes a forward movement according to the additional preferred embodiment of the present invention.
Figure 14:
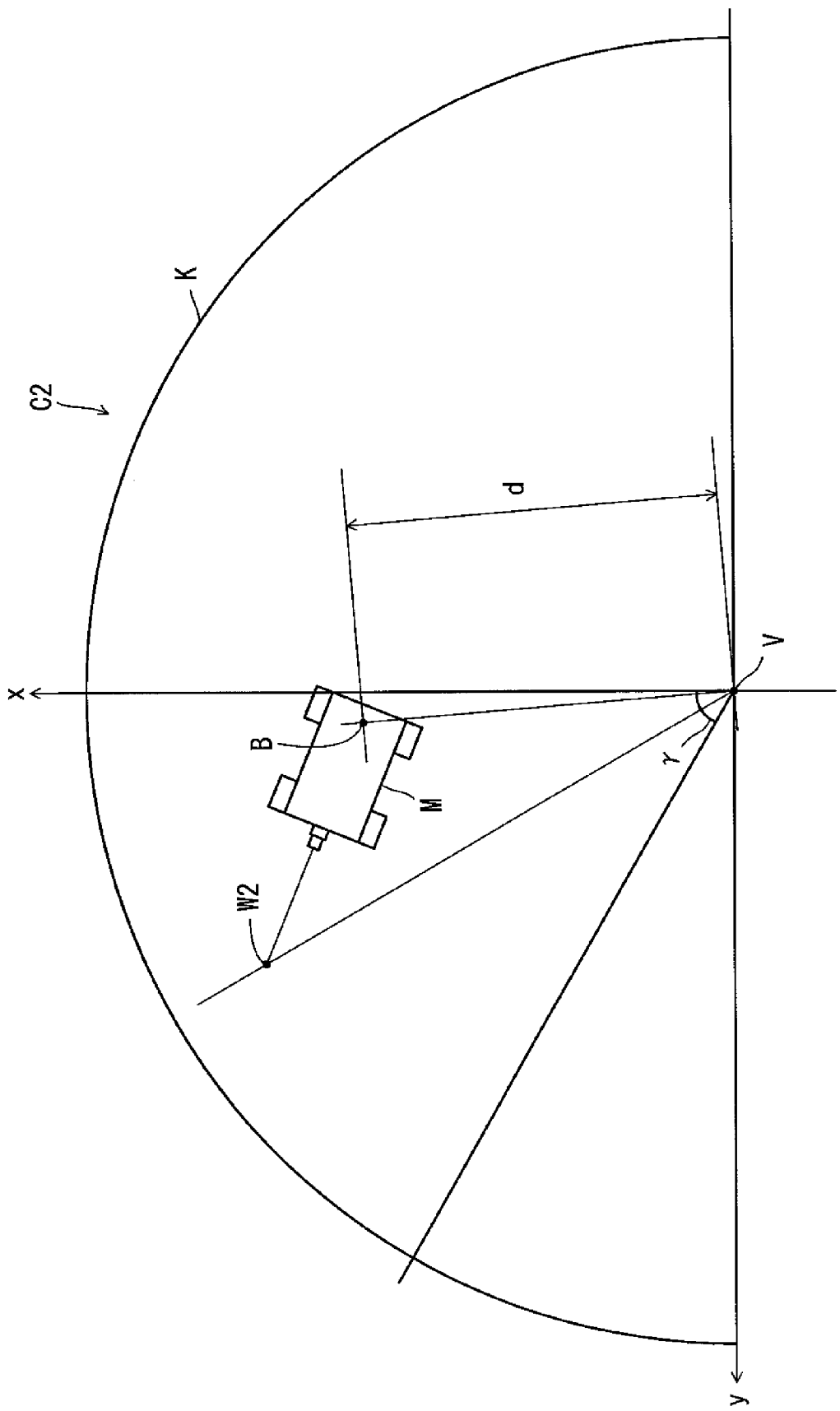
FIG. 14 shows a case where the mobile body model makes a left turn according to the additional preferred embodiment of the present invention.
Figure 15A:
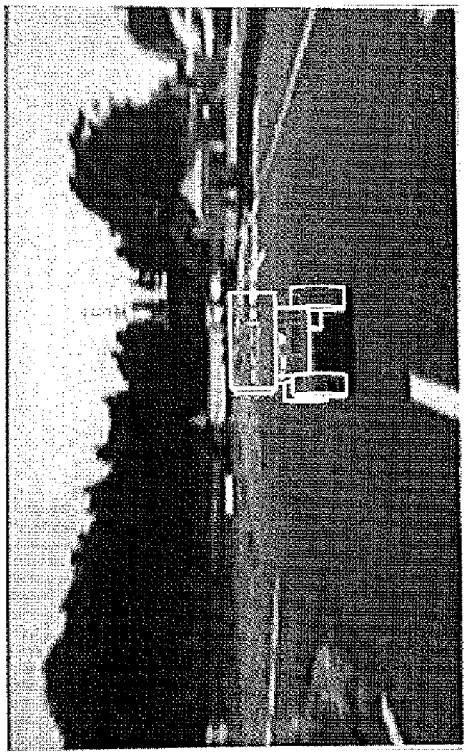
FIG. 15A through FIG. 15D show an example of display image according to the additional preferred embodiment of the present invention.
Figure 15B:
Figure 15C:
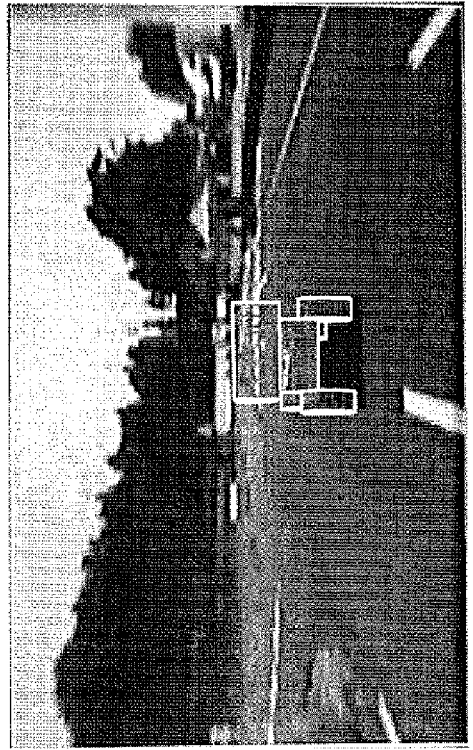
Figure 15D:
Figure 16A:
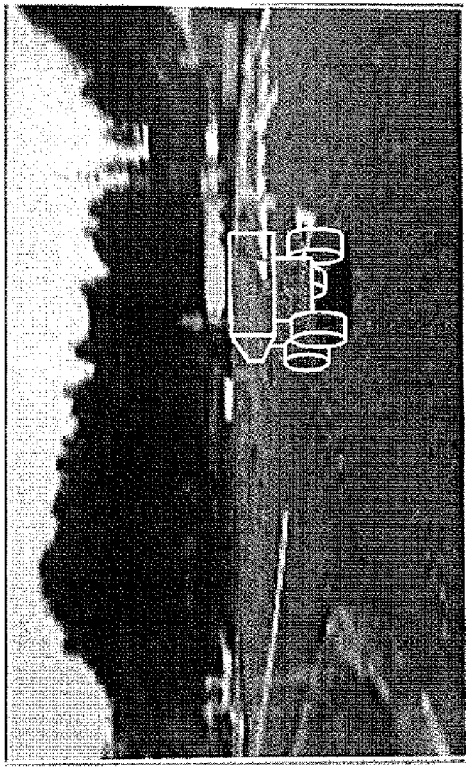
FIG. 16A through FIG. 16D show an example of display image which follows those in FIG. 15D.
Figure 16B:
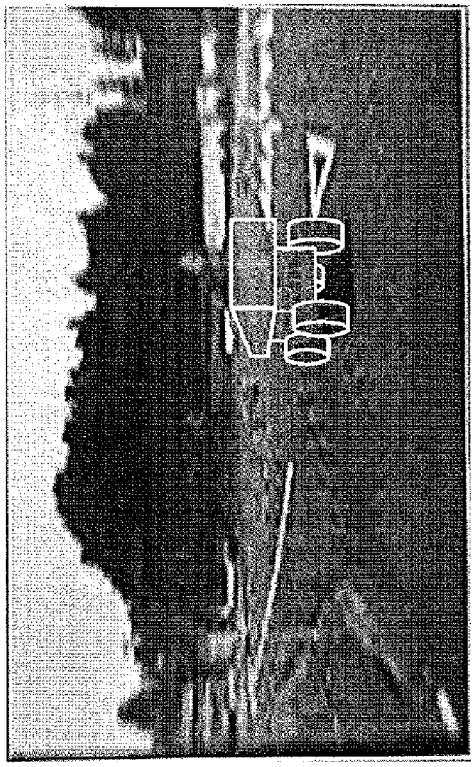
Figure 16C:
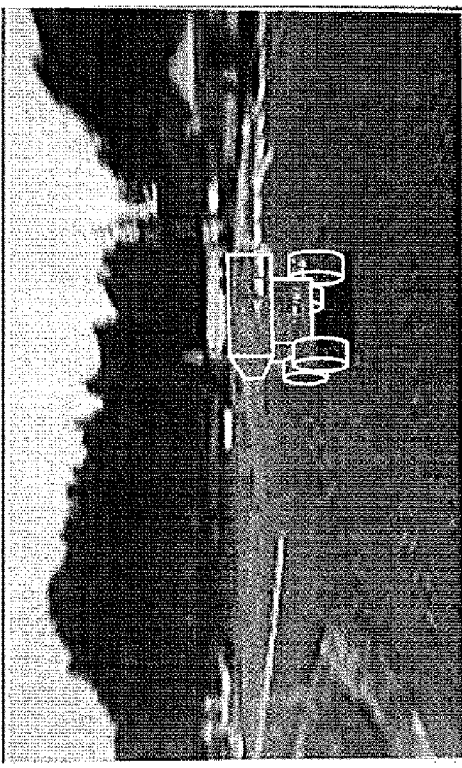
Figure 16D:
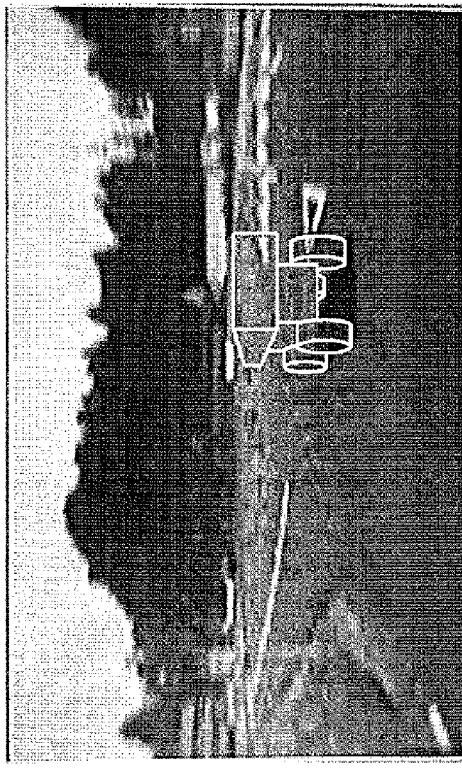

As shown in FIG. 13, when the mobile body model M moves in the forward direction with the virtual view point V at the back of the mobile body model M, the reference point B is on a line which connects the virtual view point V with the clipping center point W2. In this respect therefore, the display image preferably is the same as in the previous preferred embodiment, i.e., the reference point B is the center of the display image.

However, when the mobile body model M makes a turn, the operator is provided with a wider view on the side where the mobile body model M is turning than in the previous preferred embodiment, due to the positional relationship between the clipping center point W2 and the mobile body model M. For example, when the mobile body model M makes a left turn as shown in FIG. 14, a line which connects the virtual view point V with the clipping center point W2 provides the center line for determining the clipping range.

Therefore, use of the clipping center point W2 offers an advantage that when the mobile body model M gradually changes its orientation with respect to the virtual view point V, the turning operation is followed by a display of gradually widening view on the side the mobile body model M is moving in, providing the operator with sensory natural series of images. This helps the operator have better perception of the environment in which the mobile body 12 is moving, and allows for much easier remote control operation of the mobile body 12.

FIG. 15A through FIG. 15D and FIG. 16A through FIG. 16D show an example of how the display image will look. The actual image is provided as a motion picture, but the example is a series of eight still pictures taken at an interval of, for example, approximately 0.5 seconds for the sake of description.

In FIG. 15A through FIG. 15D and FIG. 16A through FIG. 16D, the center of display image is provided by the clipping center point W2 which is right ahead of the mobile body model M, and for this reason, a left turn by the mobile body model M is accompanied by gradually widening left-side view in which the turning is being made, without any abrupt change in the display position of the mobile body model M.

Note also that the display images in FIG. 15A through FIG. 15D and those in FIG. 16A through FIG. 16D differ from each other in the position of the virtual view point V. Even when the virtual view point V was changed from one to another as in the example, there is little change in the position and the size of the mobile body model M in the display image.

It should be noted here that in the preferred embodiments described so far, distance is preferably the basis for selection of old information. However, the present invention is not limited to this. Selection of old information may be based on time, using the same method as based on distance. Specifically, the time when the image was taken, contained in old information, is compared to the time which is, for example, about five seconds before the current time, and then a set of old information which was obtained at a time that is closest to that five-second-earlier time is selected. Another arrangement may be that the operator will make a discretionary choice from a collection of old information sent from the communications equipment 32 to the remote control apparatus 14.

Information regarding the mobile body 12 and information regarding the camera 20 may be detected by different detection devices. The position, attitude and orientation of the mobile body 12 and/or the camera 20 may be obtained, for example, via a conventional three-dimensional self-position estimation technique.

In FIG. 9A and FIG. 9B, the reference point B preferably is on a line which connects the virtual view point V with the view point A. However, the present invention is not limited to this. The reference point B may be slightly off the line, being on the middle point between the two rear wheels 30b, for example. In this case, the distance d from the virtual view point V to the reference point B is slightly different from the case in FIG. 9A and FIG. 9B, but this does not cause any practical consequences in calculating the angle of view.

In the preferred embodiments described above, description has been made for a case where the image taking device preferably is a camera 20 which has a 180° angle of view, for example. However, the image taking device is not limited to this. The image taking device may be provided by a discretionary device which is capable of taking environmental images around the mobile body. The angle of view of the image taking device should be wide, and the wider the better. For example, if the image taking device is provided by a camera which has an approximately 270° angle of view, then it becomes possible to prevent edges of the environmental image from appearing in the display image during a right/left turn.

In the preferred embodiments described above, the vertical angle of view $\beta$ is preferably calculated and then the clipping range of the projected image is determined based on the vertical angle of view $\beta$ and the aspect ratio of the display image. However, the present invention is not limited to this. For example, the horizontal angle of view $\gamma$ may be calculated, and the horizontal angle of view $\gamma$ and the aspect ratio of the display image may be used as the basis of determining the clipping range of the projected image. Another arrangement may be that the vertical angle of view $\beta$ and the horizontal angle of view $\gamma$ are calculated, and the calculated vertical angle of view $\beta$ and horizontal angle of view $\gamma$ is used as a basis of determining the clipping range of the projected image.

The mobile body according to preferred embodiments of the present invention is not limited to four wheel buggies as described above. Other examples of the mobile body are many, including construction equipment such as an excavator, and marine vessels.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A remote control system comprising a mobile body and a remote control apparatus for remotely controlling the mobile body, the mobile body including:
   an image taking device arranged to take an environmental image around the mobile body; and
   an information detection device arranged to detect information regarding the mobile body and the image taking device;

the remote control apparatus including:
   a determination device arranged to determine a virtual view point based on a detection result from the information detection device;
   a first generation device arranged to generate the virtual view point and a three-dimensional environmental image as a three-dimensional interpretation of the environmental image in a virtual space based on the environmental image taken from the virtual view point by the image taking device and a detection result from the information detection device at a time of taking the environmental image;
   a second generation device arranged to generate a mobile body model as a representation of the mobile body, a reference point which indicates a position of the mobile body, and a clipping center point in the virtual space based on a later detection result from the information detection device after taking the environmental image from the virtual view point and based on data regarding the mobile body model;
   a calculation device arranged to calculate an angle of view from the virtual view point based on a distance between the virtual view point and the reference point so as to set a smaller angle of view when there is a larger distance from the virtual view point to the reference point such that there is a generally constant proportion of a size of the mobile body model with respect to a composite image;
   a third generation device arranged to generate the composite image by clipping from a projected image obtained by perspective projection of the three-dimensional environmental image and the mobile body model from the virtual view point toward the clipping center point, the clipping being based on the angle of view from the virtual view point;
   a conversion device arranged to convert the composite image into a display image; and
   a display device arranged to display the display image.

2. The remote control system according to claim 1, wherein the clipping center point is located at a position of the reference point.

3. The remote control system according to claim 1, wherein the clipping center point is located ahead of the mobile body by a predetermined distance.

4. A remote control apparatus for remotely controlling a mobile body including an image taking device arranged to take an environmental image around the mobile body, and an information detection device arranged to detect information regarding the mobile body and the image taking device, the remote control apparatus comprising:
   a determination device arranged to determine a virtual view point based on a detection result from the information detection device;
   a first generation device arranged to generate the virtual view point and a three-dimensional environmental image as a three-dimensional interpretation of the environmental image in a virtual space based on the environmental image taken from the virtual view point by the image taking device and a detection result from the information detection device at a time of taking the environmental image;
   a second generation device arranged to generate a mobile body model as a representation of the mobile body, a reference point which indicates a position of the mobile body, and a clipping center point in the virtual space based on a later detection result from the information detection device after taking the environmental image from the virtual view point and based on data regarding the mobile body model;
   a calculation device arranged to calculate an angle of view from the virtual view point based on a distance between the virtual view point and the reference point so as to set a smaller angle of view when there is a larger distance from the virtual view point to the reference point such that there is a generally constant proportion of a size of the mobile body model with respect to a composite image;
   a third generation device arranged to generate the composite image by clipping from a projected image obtained by perspective projection of the three-dimensional environmental image and the mobile body model from the virtual view point toward the clipping center point, the clipping being based on the angle of view from the virtual view point;
   a conversion device arranged to convert the composite image into a display image; and
   a display device arranged to display the display image.

* * * * *